(12) United States Patent
Lu et al.

(10) Patent No.: US 12,640,941 B2
(45) Date of Patent: May 26, 2026

(54) SYSTEMS AND METHODS FOR PROVIDING RELIABLE PHYSICALLY UNCLONABLE FUNCTIONS

(71) Applicant: Taiwan Semiconductor Manufacturing Company Limited, Hsinchu (TW)

(72) Inventors: Shih-Lien Linus Lu, Hsinchu (TW); Cheng-En Lee, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 0 days.

(21) Appl. No.: 17/873,252

(22) Filed: Jul. 26, 2022

(65) Prior Publication Data

US 2022/0360456 A1 Nov. 10, 2022

Related U.S. Application Data

(63) Continuation of application No. 16/785,878, filed on Feb. 10, 2020, now Pat. No. 11,438,180.

(51) Int. Cl.
H04L 9/32 (2006.01)
G06F 21/73 (2013.01)
(Continued)

(52) U.S. Cl.
CPC ............ H04L 9/3278 (2013.01); G06F 21/73 (2013.01); H04L 9/0866 (2013.01); H04L 9/12 (2013.01);
(Continued)

(58) Field of Classification Search
CPC ....... H04L 9/3278; H04L 9/0866; H04L 9/12; H01L 27/0922; H01L 2027/11825; G06F 21/73
See application file for complete search history.

(56) References Cited

U.S. PATENT DOCUMENTS 9,281,055 B2 * 3/2016 Sahu ...................... G11C 11/419
9,590,626 B1 * 3/2017 Pedersen ............ G01R 27/2605
(Continued)

FOREIGN PATENT DOCUMENTS

KR    20190019870    2/2019
WO    2017186816    11/2017

OTHER PUBLICATIONS

German Office Action; Application No. 102020107126.4; dated Jan. 26, 2021.
(Continued)

*Primary Examiner* — Vanthu T Nguyen
(74) *Attorney, Agent, or Firm* — Jones Day

(57) ABSTRACT

Systems and method are provided for determining a reliability of a physically unclonable function (PUF) cell of a device. A first signal is provided to a first branch of a PUF cell and a second signal is provided to a second branch of the PUF cell, the first and second signals being provided in synchronization. A base PUF cell value is determined based on an output of the PUF cell produced by the first signal and the second signal. A third signal is provided to the first branch and a fourth signal is provided to the second branch, the third signal and fourth signal being provided out of synchronization. A stressed PUF cell value is determined based on an output of the PUF cell produced by the third signal and the fourth signal. The PUF cell is determined to be unusable based on a difference between the PUF cell value and the stressed PUF cell value.

20 Claims, 13 Drawing Sheets

(51) Int. Cl.

| | |
|---|---|
| *H04L 9/08* | (2006.01) |
| *H04L 9/12* | (2006.01) |
| *H10D 84/85* | (2025.01) |
| *H10D 84/90* | (2025.01) |

(52) U.S. Cl.
CPC ......... *H10D 84/856* (2025.01); *H10D 84/925* (2025.01)

(56) References Cited

U.S. PATENT DOCUMENTS

| | | | | |
|---|---|---|---|---|
| 9,762,400 | B2 * | 9/2017 | Mathew | ........... H03K 19/17768 |
| 10,256,983 | B1 | 4/2019 | Bauer et al. | |
| 10,491,407 | B2 | 11/2019 | Voutilainen | |
| 10,764,069 | B1 * | 9/2020 | Hurwitz | ................ H04L 9/3278 |
| 11,265,178 | B1 | 3/2022 | Cohen | |
| 2015/0098268 | A1 | 4/2015 | Yabuuchi | |
| 2017/0180140 | A1 | 6/2017 | Mai et al. | |
| 2017/0200508 | A1 | 7/2017 | Grigoriev et al. | |
| 2018/0083774 | A1 | 3/2018 | Tazzari et al. | |
| 2018/0102163 | A1 | 4/2018 | Lin et al. | |
| 2018/0198447 | A1 | 7/2018 | Rice et al. | |
| 2018/0218177 | A1 | 8/2018 | Kuenemund et al. | |
| 2019/0026724 | A1 | 1/2019 | Wade et al. | |
| 2019/0058603 | A1 | 2/2019 | Lin et al. | |
| 2019/0068190 | A1 | 2/2019 | Karpinskyy et al. | |
| 2019/0378575 | A1 | 12/2019 | Lu | |
| 2020/0014547 | A1 | 1/2020 | Lu et al. | |
| 2020/0044872 | A1 | 2/2020 | Willsch et al. | |
| 2020/0177399 | A1 | 6/2020 | Speed et al. | |
| 2020/0342122 | A1 | 10/2020 | Toyoshima et al. | |
| 2021/0021435 | A1 | 1/2021 | Hurwitz | |
| 2021/0385080 | A1 | 12/2021 | Golofit et al. | |

OTHER PUBLICATIONS

Korean Notice of Allowance; Application No. 10-2020-0075722; dated Jan. 13, 2022.

Taiwanese Office Action; Application No. 1110101374; dated Apr. 20, 2022.

* cited by examiner 202                           204

702

|  | a + 0ps | a + 10ps | a + 20ps | a + 30ps |
|---|---|---|---|---|
| b + 0ps | 0 | 0 | 0 | 0 |
| b + 10ps | 0 | 0 | 0 | 0 |
| b + 20ps | 0 | 0 | 0 | 0 |
| b + 30ps | 0 | 0 | 0 | 0 |

704

|  | a + 0ps | a + 10ps | a + 20ps | a + 30ps |
|---|---|---|---|---|
| b + 0ps | 1 | 1 | 1 | 1 |
| b + 10ps | 1 | 1 | 1 | 1 |
| b + 20ps | 1 | 1 | 1 | 1 |
| b + 30ps | 1 | 1 | 1 | 1 |

706

|  | a + 0ps | a + 10ps | a + 20ps | a + 30ps |
|---|---|---|---|---|
| b + 0ps | 0 | 1 | 0 | 1 |
| b + 10ps | 1 | 0 | 1 | 0 |
| b + 20ps | 0 | 1 | 1 | 1 |
| b + 30ps | 1 | 1 | 1 | 0 |

708

|  | a + 0ps | a + 10ps | a + 20ps | a + 30ps |
|---|---|---|---|---|
| b + 0ps | 0 | 0 | 0 | 1 |
| b + 10ps | 0 | 0 | 0 | 0 |
| b + 20ps | 0 | 0 | 0 | 0 |
| b + 30ps | 0 | 0 | 0 | 0 |

FIG. 7

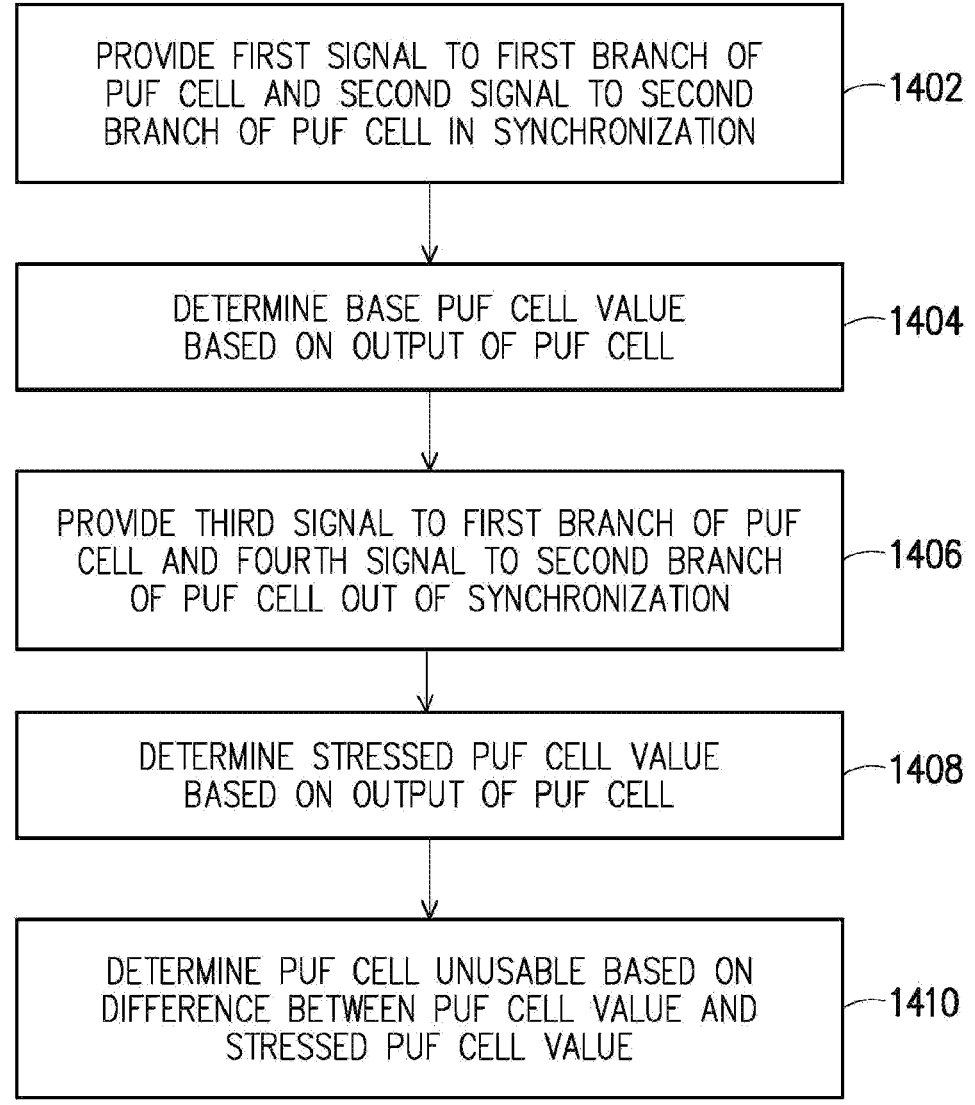

PROVIDE FIRST SIGNAL TO FIRST BRANCH OF PUF CELL AND SECOND SIGNAL TO SECOND BRANCH OF PUF CELL IN SYNCHRONIZATION — 1402

DETERMINE BASE PUF CELL VALUE BASED ON OUTPUT OF PUF CELL — 1404

PROVIDE THIRD SIGNAL TO FIRST BRANCH OF PUF CELL AND FOURTH SIGNAL TO SECOND BRANCH OF PUF CELL OUT OF SYNCHRONIZATION — 1406

DETERMINE STRESSED PUF CELL VALUE BASED ON OUTPUT OF PUF CELL — 1408

DETERMINE PUF CELL UNUSABLE BASED ON DIFFERENCE BETWEEN PUF CELL VALUE AND STRESSED PUF CELL VALUE — 1410

FIG. 14

SYSTEMS AND METHODS FOR PROVIDING RELIABLE PHYSICALLY UNCLONABLE FUNCTIONS

CROSS-REFERENCE TO RELATED APPLICATION

This application is a continuation of U.S. patent application Ser. No. 16/785,878, filed Feb. 10, 2020, which is incorporated herein by reference in its entirety.

BACKGROUND

A physically unclonable function (PUF) refers to a physical structure that is embodied in a physical device. Today, PUFs are usually implemented in integrated circuits and are typically used in applications with security requirements. Although manufactured in high volume, each integrated circuit (IC) is unique due to the physical randomness even with the same manufacturing process and the same material. This inherent variation can be extracted and used as its unique identification.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 is a diagram depicting example PUF cell outputs based on varying simulated stress conditions in an exemplary embodiment.

FIG. 14 is a flow diagram depicting steps of a method is provided for determining a reliability of a physically unclonable function (PUF) cell of a device in accordance with embodiments.

DETAILED DESCRIPTION

Figure 1:
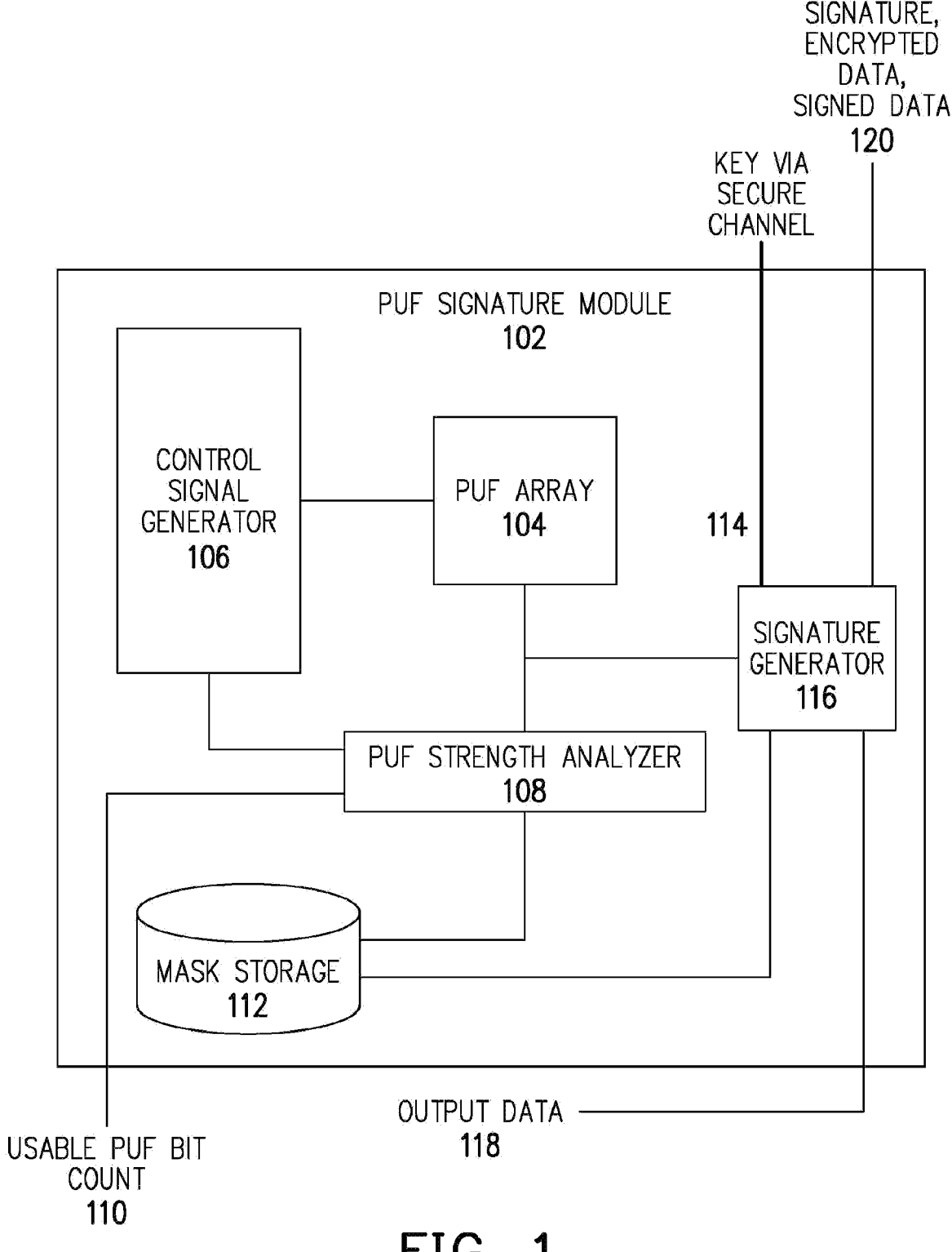
FIG. 1 is a block diagram depicting a testable PUF signature module for producing a PUF signature that identifies an integrated circuit in an exemplary embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A PUF is a physically-defined "digital fingerprint" that serves as a unique identifier for a semiconductor device such as a microprocessor. They are based on unique, typically random physical variations which occur naturally during semiconductor manufacturing. A PUF value can take the form of a string of bits that may be used as a unique or near-unique value to identify a particular device (e.g., in a communication from an Internet of Things (TOT) device) as an encryption key for protecting contents of a transmitted message, or as a digital signature confirming an identity of a device transmitting data as described further herein.

Because a PUF value relies on randomness of a manufacturing process (e.g., different PUF cells providing different bit values based on small variances between two similar-structure transistors), the behavior and reliability of PUF cells is not known until after device manufacture. In some instances, a PUF cell may provide anomalous or unreliable behavior. For example, when a PUF cell's output is determined by very small differences among manufactured transistors, in instances where those transistors are identical or very nearly identical, the output of that PUF cell may not be reliably the same during every read as desired of a unique identifier. A PUF cell that outputs a 1 value in some instances and a 0 value in others ("a weak bit" or "a dark bit") is typically undesirable. Operational environments (e.g., thermal conditions, supply voltage variations) can produce conditions more likely to cause such undesirable variations. Systems and methods described here, in embodiments, provide mechanisms for testing PUF cell reliability to identify PUF cells whose bit values that are unlikely to change ("strong bits") even under operational environment stresses.

FIG. 1 is a block diagram depicting a testable PUF signature module for producing a PUF signature that identifies an integrated circuit in an exemplary embodiment. The PUF signature module 102 includes a PUF array 104 that, in embodiments, comprises an array of PUF cells, a value of each PUF cell being dependent on manufacturing process variations such that PUF arrays of different PUF signature modules 102 produce different signatures. The PUF array 104 may be of differing sizes (e.g., 8×8, 16×16, 16×32, 64×64), with larger arrays providing longer signatures that are more likely to be unique and harder to replicate (e.g., crack).

The PUF signature module 102 includes certain components for testing the reliability of cells of the PUF array 104. In the example of FIG. 1, a control signal generator 106 is configured to provide activation signals to PUF cells in the PUF array 104. In embodiments, the control signal generator 106 is configured to provide those control signals in different modes. In one mode (e.g., an operational mode), the control signal generator 106 provides control signals to inputs of a PUF cell simultaneously or substantially simultaneously (i.e., in synchronization). In a second mode (e.g., a testing mode), the control signal generator 106 provides control signals to inputs of the PUF cell at varying times (e.g., to one input of the PUF cell shortly after an input to another input of the PUF cell) (i.e., out of synchronization) to simulate stress on the PUF cell. A PUF strength analyzer 108 can in embodiments command the generator 106 to provide control signals to the PUF array 104 and evaluates outputs of the PUF cells based on controls signals from the generator 106. If the PUF cell provides inconsistent output values across the different control modes provided by the control signal generator 106, then the PUF strength analyzer 108 may deem the PUF cell to be a weak bit that is not sufficiently reliable for use in the unique signature produced by the PUF array 104.

The PUF signature module 102 may operate in a variety of modes. In a first testing mode, the module 102 tests the cells of the PUF array 104 to determine a number of PUF cells that are sufficiently reliable for use as a device identifier. In that testing mode, as controlled by the PUF strength analyzer 108, the control signal generator 106 may provide input signals to a PUF cell with varying timing (e.g., in synchronization, out of synchronization). The PUF strength analyzer 108 monitors output of the PUF cell to see whether it changes based on simulated stress conditions. Changed outputs may result in the analyzer 108 deeming that PUF cell a weak cell. The PUF strength analyzer 108 tracks a count weak (or strong) PUF cells and outputs a usable PUF bit count 110.

The usable PUF bit count 110 may be used as a qualification or a classification value for the PUF signature module 102. For example, the PUF signature module 102 may be deemed failed when the usable PUF bit count 110 is less than a threshold number. Or the PUF signature module 102 may be assigned a classification based on the usable PUF bit count 110. For example, for a 1024 bit (32×32) PUF array 104, the module 102 may be deemed approved for high security applications (e.g., where sensitive data is to be transmitted using encryption, where confirmation of identity of the module 102 is of critical importance, military applications) when the usable PUF bit count is greater than 999. In that example, the module 102 may be deemed approved for lower security operations (e.g., for an IOT application such as a refrigerator or other appliance, a television) when the usable PUF bit count 110 is greater than 799 but less than 1000. The module 102 may be identified as failed when the count 110 is less than 800.

In a second, initialization mode the control signal generator 106 again on control of the PUF strength analyzer 108 provides control signals to the PUF array 104 in synchronization and out of synchronization, where the PUF strength analyzer 108 monitors the PUF array 104 to identify weak PUF cells (e.g., PUF cells whose output changes under simulated stress conditions) to create a mask stored at 112 that identifies PUF cells that are deemed too unreliable for use in generating the unique identifier of the module 102.

Figure 2:
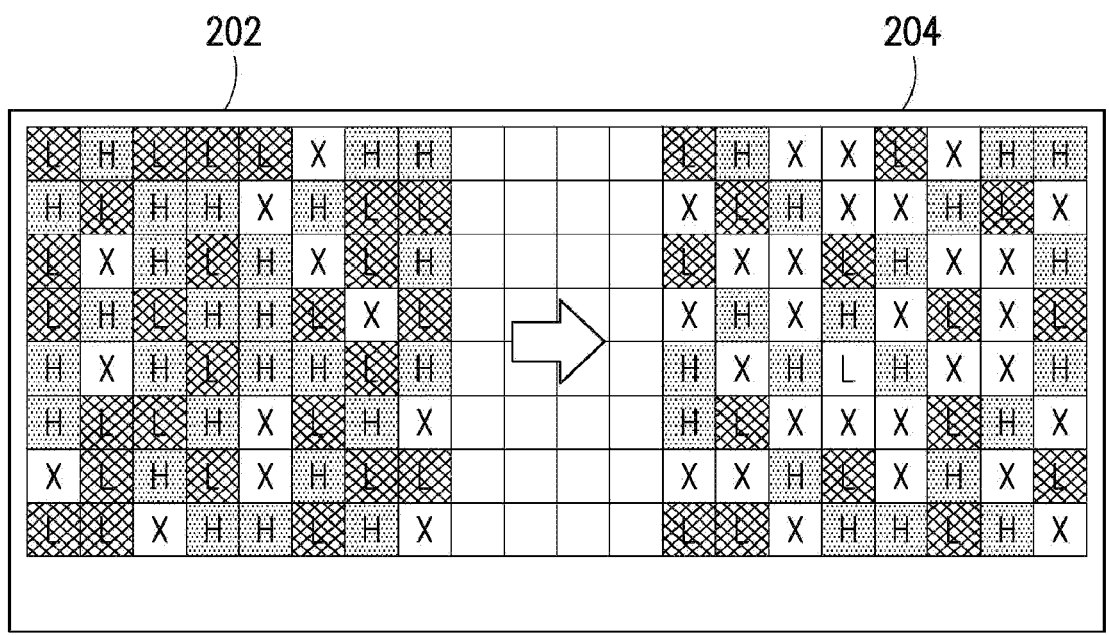
FIG. 2 is a diagram depicting a PUF cell mask in accordance with an embodiment.

FIG. 2 is a diagram depicting a PUF cell mask in accordance with an embodiment. The mask is for a 64 bit (8×8) PUF array. A first iteration of the mask 202 is provided by controlling the PUF cells in operation-like mode (e.g., with inputs to the PUF cells being provided in synchronization) to identify PUF cell values (Low "L" or High "H") for each PUF cell. PUF cell output values that change when operation-like control signals are provided multiple times are likely very weak and are indicated as unreliable by an "X" in the mask 202. The control signal generator 106 then provides control signals in a stress mode (e.g., slightly out of synchronization) to identify additional PUF cells whose output changes when under stress. PUF cells whose values change under simulated stress may be deemed unreliable and are identified in the mask 204 (with an X) stored at 112.

With reference back to FIG. 1, following generation of the mask and storage at 112, the PUF signature module 102 is ready to output its unique identifier (e.g., via a secure channel 114). Specifically, the control signal generator 106 activates the PUF array 104 using operation-mode control signals (e.g., signals in synchronization), with the resulting PUF cell values being provided to a signature generator 116. The signature generator 116 accesses the mask from the mask storage 112 and disregards PUF cell values from bits identified as unreliable by the mask. The signature generator 116 transmits the resulting signature to a recipient that then associates the signature to the particular PUF signature module 102. The signature transmission may be performed in a variety of ways, such as via a secure pin(s) that is disabled (e.g., by blowing a fuse) after outputting of the signature, or in encrypted form using a public key of the receiving device. In some lower security examples, the signature may be output in plain form via an unsecure channel.

With the signature of the module 102 now associated with the module, the signature can then be used in operational mode. In operational mode, the PUF signature module 102 regenerates its signature (e.g., one time on integrated circuit start up, at the start of each integrated circuit external communication), with the control signal generator 106 providing operation control signals (e.g., in synchronization) to the PUF array, with the signature generator 116 generating the signature from the PUF array 104 output, disregarding unreliable PUF cells identified by the mask accessed from 112.

The signature is then used to transmit data from the integrated circuit. In one example, the module 102 signature is appended (e.g., in a header) by the signature generator 116 to output data 118 of the integrated circuit that is transmitted from the integrated circuit at 120 to identify the source of the data being transmitted. In one example, the data is signed by the signature generator 116 using the signature such that the recipient of the signed data can verify the source of that data. In another example, the signature generator 116 encrypts the output data 118 using the signature, such that the encrypted data can be decrypted by a recipient who has previously received and associated the signature with the integrated circuit on which the PUF signature module 102 resides.

Figure 3:
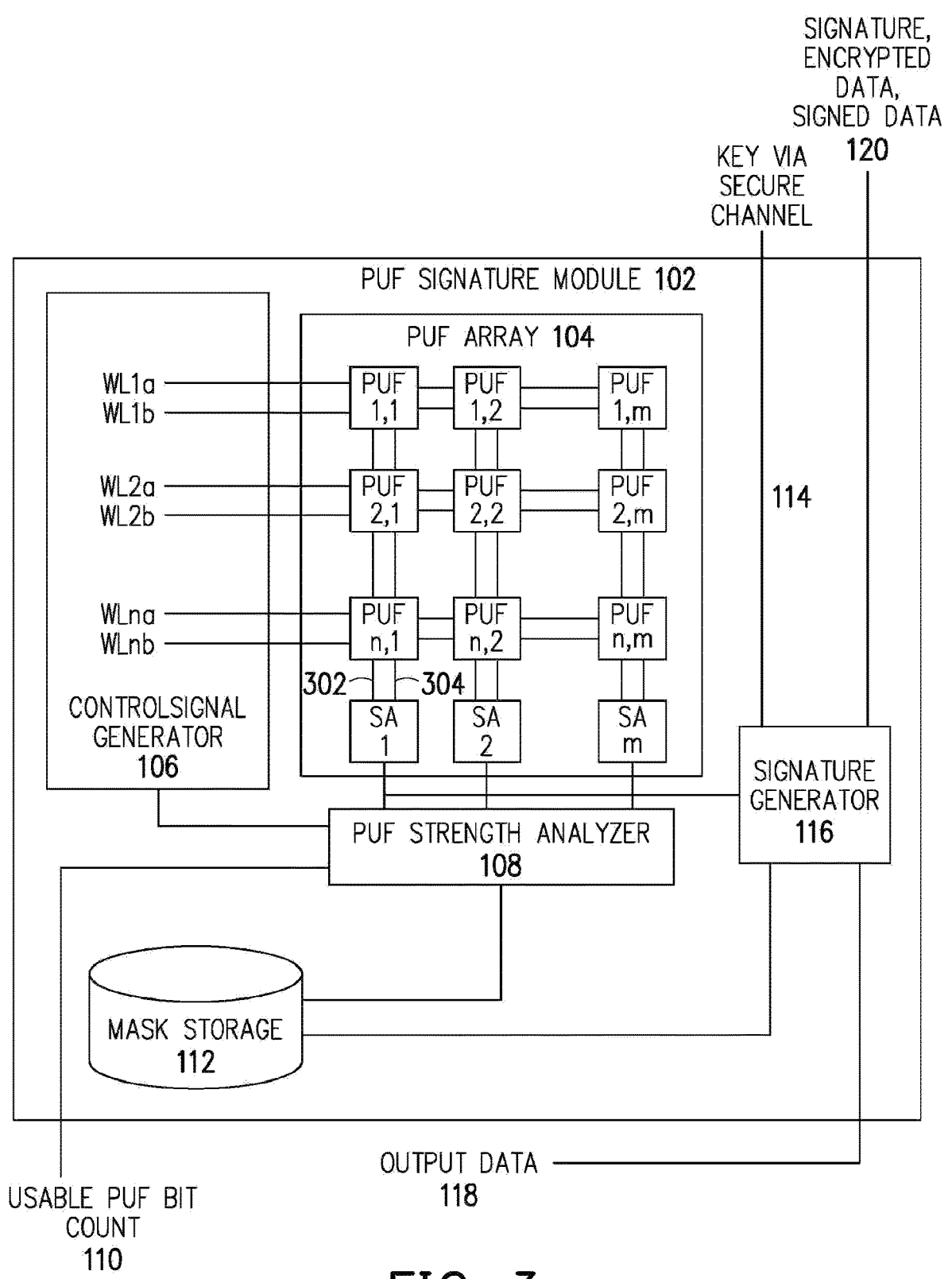
FIG. 3 is a diagram depicting a control signal generator sending control signals to cells of a PUF array in accordance with an embodiment.

FIG. 3 is a diagram depicting a control signal generator sending control signals to cells of a PUF array in accordance with an embodiment. The PUF array comprises a plurality of PUF cells 1,1 . . . n,m arranged into n rows and m columns. Each PUF cell receives two input signals (e.g., WL1a, WL1b is received by PUF cells, 1,1; 1,2; . . . 1,m) and provides an output signal via two bit lines (e.g., 302, 304). The control signal generator 106 provides control signals to activate PUF cells of a row of the PUF array 104 at the same time. Each of them columns of PUF cells is associated with a sense amplifier SA1, SA2, . . . , SAm. Each sense amplifier is configured to sense which of the two bit lines to which it is responsive (e.g., 302, 304 for sense amp SA1) is at a higher level, where a value for a PUF cell is determined accordingly (e.g., when WL2a and WL2b activate PUF cells of the second row of the array, SA1 will determine PUF cell 2,1 is a high (1) value when bit line 302 is sensed to be at a higher level than bit line 304 and a low (0) value when bit line 302 is sensed to be at a lower level than bit line 304).

To generate a signature for the PUF signature module 102, the control signal generator 106 activates the PUF cells of the array 104 row by row, with the sense amplifiers determining whether the PUF cells of that row are high or low value. The signature generator 116 captures those high/low sense amplifier outputs, and may ignore PUF cell bits as instructed by the mask accessed from 112 to determine the integrated circuit signature.

Figure 4:
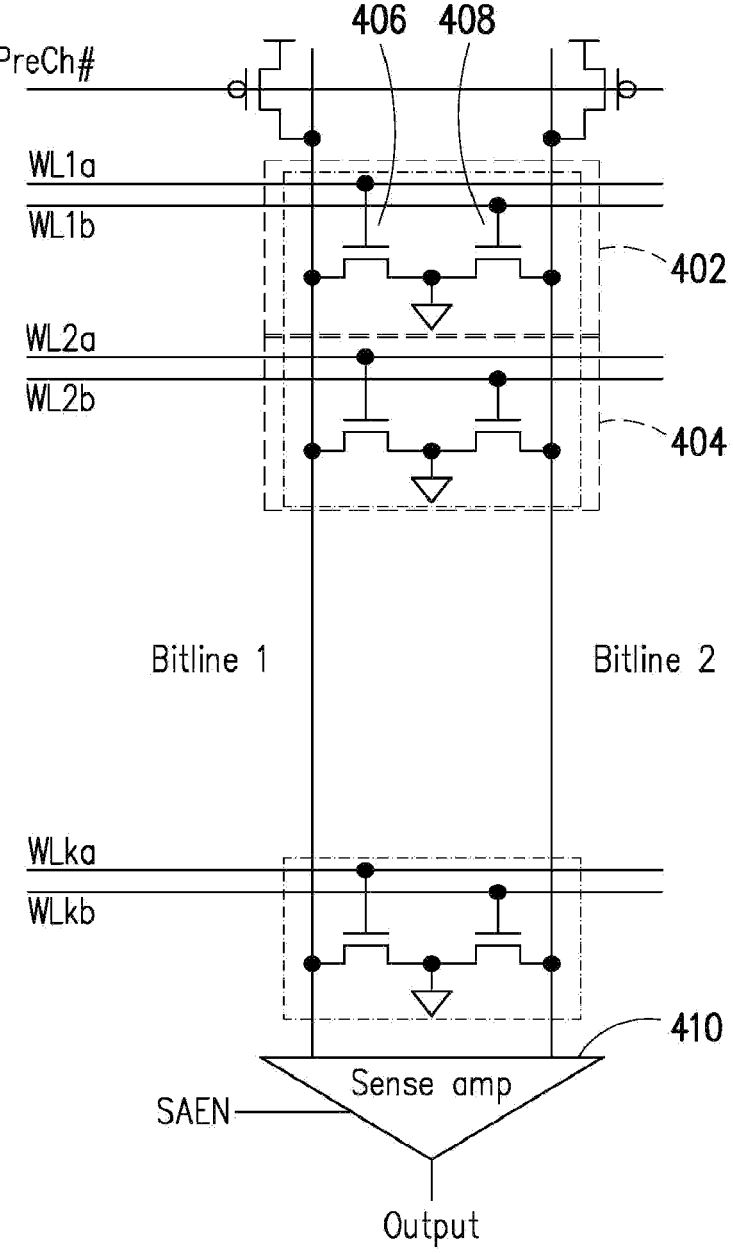
FIG. 4 is a diagram depicting an example structure of a column of PUF cells in an exemplary embodiment.

PUF cells, whose value varies based on manufacturing process variances, may take a variety of forms. FIG. 4 is a diagram depicting an example structure of a column of PUF cells in an exemplary embodiment. Each cell (e.g., 402, 404, which could, for example, corresponding to PUFs 1,1; and 2,1 of FIG. 3) includes two similarly structured transistors (e.g., NMOS transistors 406, 408 for PUF cell 402). PUF cell 402 receives two input signals WL1a, WL1b, where input signal WL controls the gate of transistor 406 and input signal WL1b controls the gate of transistor 408. One terminal of each transistor 406, 408 is connected to a bit line (i.e., transistor 406 is connected to Bitline1 (BL #) and transistor 408 is connected to Bitline2 (BL)), with the other terminal being connected to a common, ground node.

Figure 5:
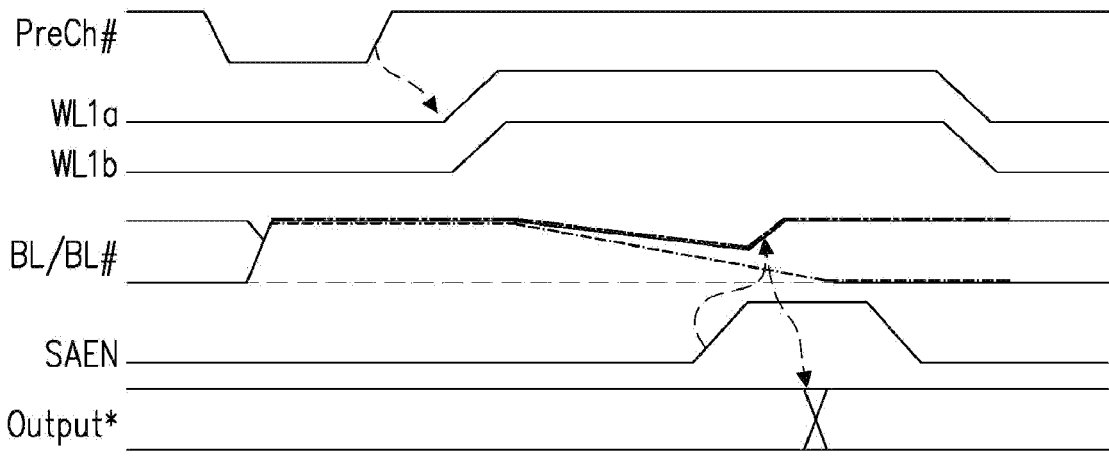
FIG. 5 is a timing diagram depicting signals received and produced via a PUF cell when its input signals are provided in synchronization in an exemplary embodiment.

FIG. 5 is a timing diagram depicting signals received and produced via PUF cell 402 when its input signals are provided in synchronization in an exemplary embodiment. As discussed above, control signals (WL1a, WL1b) are provided to the inputs of the PUF cell (e.g., the gates of transistors 406, 408) in synchronization (i.e., at the same or substantially the same time) to determine a base PUF cell value in a testing mode or to determine a PUF cell value in an operational mode. A pre-charge signal (PreCh #) goes low, which charges the two bit lines BL/BL # to a high level. The control signals WL1a, WL1b are brought high at the same time, which activates the transistors 406, 408. The now-active transistors 406, 408 pull the bit lines low. But process variations (e.g., slight differences in fabricated structure between transistors 406, 408) cause the transistors 406, 408 to pull the bit lines BL/BL # low at slightly different rates (i.e., transistor 408 pulls bitline BL low faster than transistor 406 pulls bitline BL # low). During the transition of the bit lines BL/BL #, the sense amplifier 410 (e.g., SA1 of FIG. 3) is activated via a sense amp enable signal SAEN. The sense amplifier 410 is configured to detect a difference between signal levels on the bit lines BL/BL # on activation and to force the bit line that is at a higher level (i.e., BL # in the example of FIG. 5) to a high level and the bit line that is at a lower level (i.e., BL in the example of FIG. 5) to a low level. The sense amplifier 410 outputs a corresponding data value (Output) for the PUF cell based on which of the bit lines BL/BL # was forced to the high level (e.g., a high (1) value if BL is forced high, a low (0) value if BL # is forced high). Following sensing of a PUF cell value for cell 402, the control signal generator 106 can pre-charge the bit lines again and activate PUF cell 404 via control lines WL2a, WL2b in a similar fashion, with a PUF cell value for cell 404 being determined in conjunction with the sense amplifier 410, with subsequent rows of PUF cells being similarly activated and detected.

Figure 6:
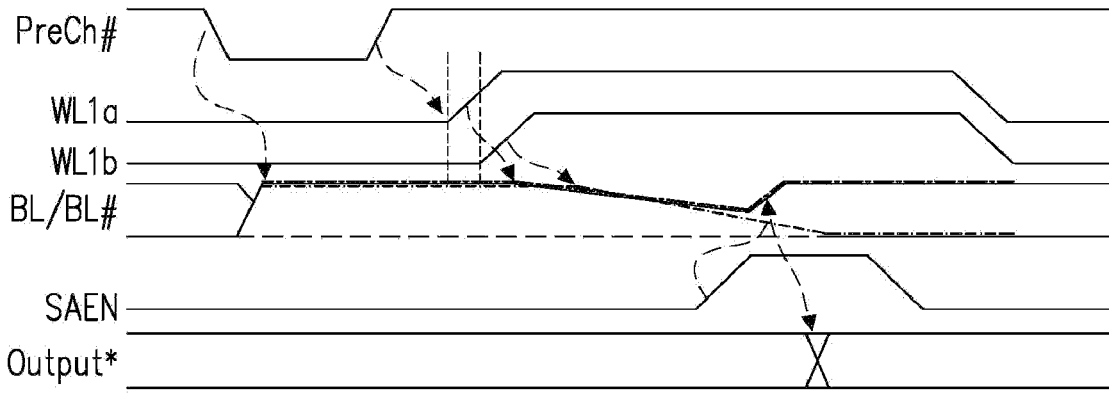
FIG. 6 is a timing diagram depicting signals received and produced when its input signals are provided out of synchronization in an exemplary embodiment.

As noted above, the control signal generator 106 can simulate stress on PUF cells by providing control signals out of synchronization. FIG. 6 is a timing diagram depicting signals received and produced via PUF cell 402 when its input signals (WL1a, WL1b) are provided out of synchronization in an exemplary embodiment. As in the example of FIG. 5, a pre-charge signal (PreCH #) is activated low to charge the bit lines BL/BL # to a high level. The control signal generator 106 again activates PUF cell 402 by bringing input signals WL1a and WL1b high. But in this example, the control signal generator 106 activates control signal WL1b, controlling transistor 408, a short time (e.g., 1 ms, 2 ms, 1 μs, 2 μs, 1 ns, tens of ps) later than control signal WL1a is activated. Upon receiving their respective activation signals, the transistors 406, 408 begin pulling their respective bit lines low via the common ground node. In the example of FIG. 6, despite transistor 408 being activated later than transistor 406, transistor 408 pulls Bitline2 BL lower than transistor 406 pulls Bitline1 BL # by the time the sense amplifier 410 is activated. PUF cell 404 is thus detected as providing the same output despite the simulated stress of activating transistor 408 out of synchronization with the activation of transistor 406. This consistent output is indicative of a stronger, more reliable PUF cell.

During a testing mode, to generate a useable PUF cell count 110, or during an initialization mode when a PUF cell mask is generated for storage at 112, the control signal generator 106 may test the PUF cells under a variety of simulated stress conditions. FIG. 7 is a diagram depicting example PUF cell outputs based on varying simulated stress conditions in an exemplary embodiment. In each of the depicted tables, the control signal generator 106 is configured to delay each of the control signals (e.g., WL1a, WL1b) each of Ops, 10 ps, 20 ps, 30 ps for a total of sixteen combinations of stress simulation delays. PUF cell outputs are tracked across those sixteen tests (4 synchronously where the control signals are provided at the same time in the diagonal entries, six times where the first control signal WL1a is activated first, and six times where the second control signal WL1b is activated first), with those outputs being displayed in the tables. In a first table 702, the PUF cell outputs a low (0) value in all sixteen tests. This is indicative of a strong PUF cell. Similarly in the second table 704, the PUF cell outputs a high (1) value in all sixteen tests, again indicating a strong PUF cell. In the third table 706, the PUF cell provides varying outputs, even providing different outputs when receiving control inputs in synchronization (i.e., a 0 is output when both input signals are delayed, 0, 10, and 30 ps but a 1 is output when both input signals are delayed 20 ps). This table is indicative of a weak PUF cell bit that should be disregarded in generating a device identifier. The fourth table 708 indicates a PUF cell that provides a low (0) output value in all cases except for where control line WL1a is delayed 30 ps relative to control line WL1b. In some implementations, this may be a significant enough anomaly to identify the PUF cell as weak and include it in a mask of bits to be disregarded. In some instances, this anomaly may be deemed by the PUF strength analyzer 108 to be of insufficient concern (e.g., based on a combination of pre-defined criteria) for identification of an unreliable cell. In another example, the anomaly at 708 may result in the PUF signature module 102 and its corresponding integrated circuit being classified at a lower degree of quality, which may affect pricing or permitted scenarios of use.

Figure 8:
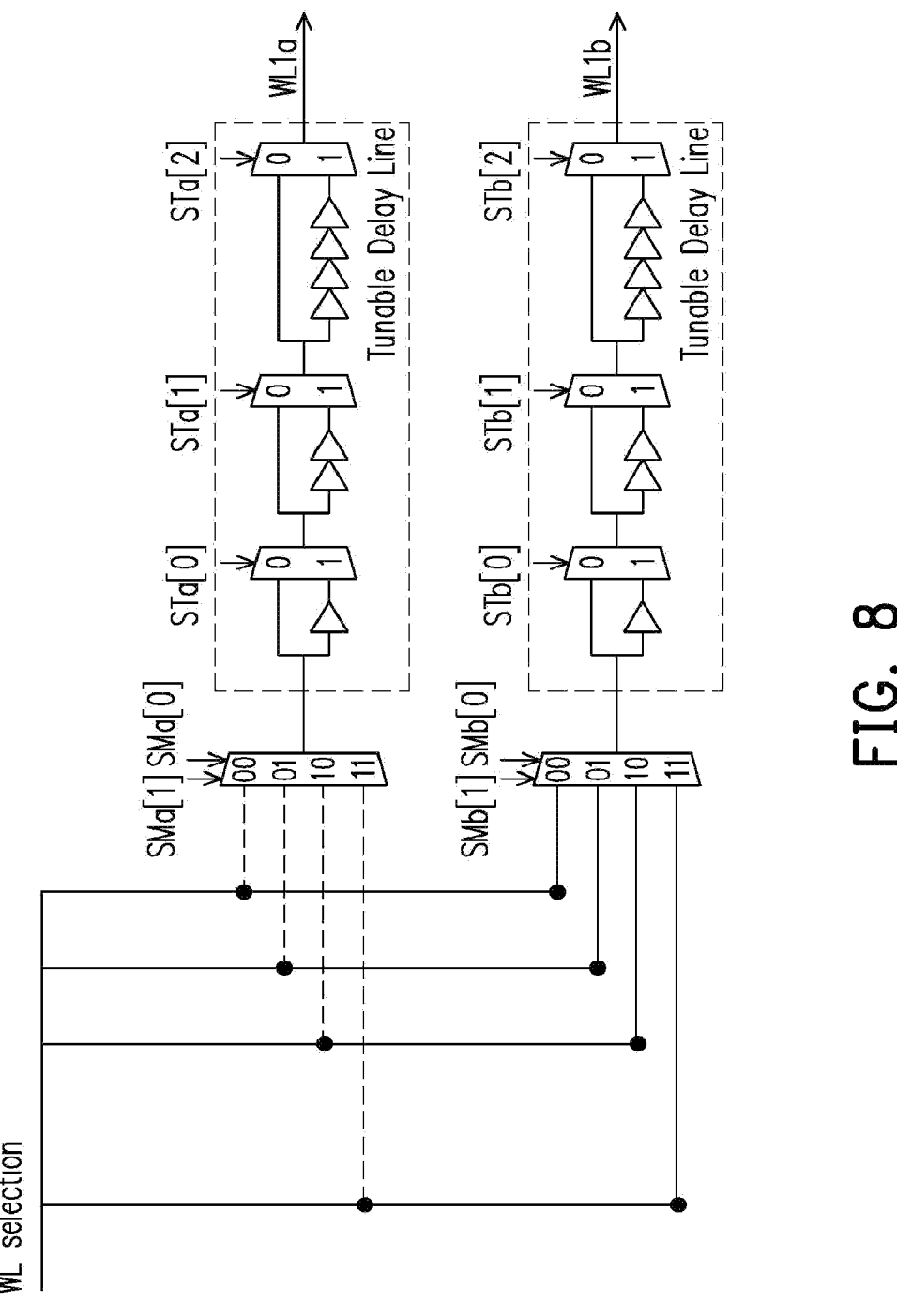
FIG. 8 is a block diagram depicting a first control signal generation circuit in an exemplary embodiment.
Figure 9:
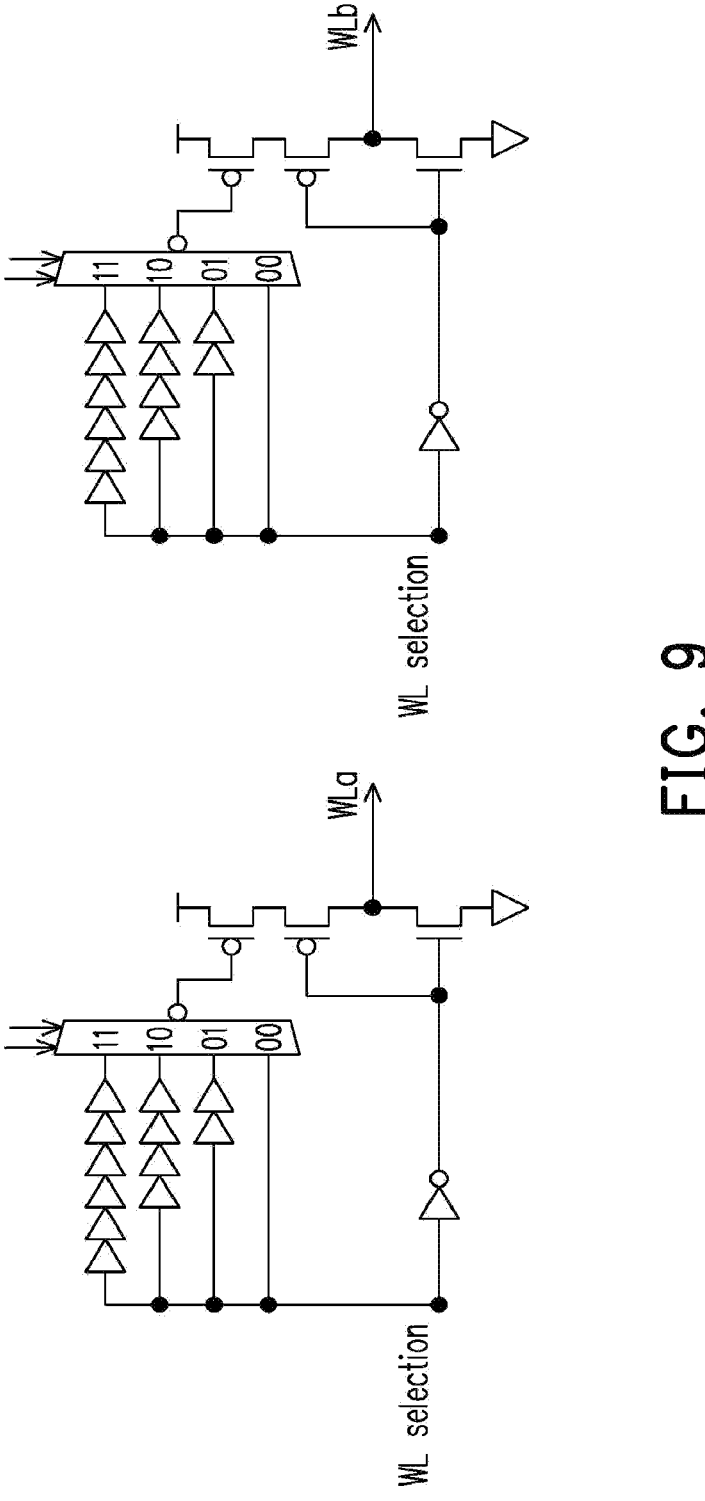
FIG. 9 depicts a first circuit for generating WLa/WLb controls signals from a WL selection signal in an embodiment.

A variety of circuits may be utilized to implement a control signal generator 106. FIG. 8 is a block diagram depicting a first control signal generation circuit in an exemplary embodiment for generating control line signals (e.g., on WL1a/WL1b) in synchronization and out of synchronization to implement the exemplary systems and methods described above. Each pair of control lines (e.g., WL1a/WL1b, WL2a/WL2b) may include the circuit of FIG. 8. A first set of inputs to a tunable delay line (STa[0], STa[1], STa[2]; STb[0], STb[1], STb[2]) enables or inhibits sets of 1, 2, 4 delay buffers. Cycle multiplexers are then controlled by a second set of inputs (SMa[1], SMa[2]; SMb[1], SMb[2]) to apply different delays to respective control signals WL1a, WL1b, a respective pair of control signals being selected based on a word line decoder signal (e.g., a decoder signal that cycles progressively through each row of the PUF array 104). Circuitry associated with the word line selection input (e.g., a signal indicating that the PUF cells associated with control lines WL1a/WL1b are to be operated at different delays) is configured to cycle through the multiplexer inputs 00, 01, 10, 11 on each of the component lines of the pairs of control lines (e.g., WL1a/WL1b, WL2a/WL2b).

Where the control signal generator circuit of FIG. 8 enables tunable delays via its STa/b controls, delays can be generated directly from a PUF cell row selection signal as well. FIG. 9 depicts a first circuit for generating WLa/WLb controls signals from a WL selection signal in accordance with embodiments. The left circuit provides control signals for control line WLa, and the right circuit provides control signals for control line WLb. When a row of PUF cells associated with the circuit of FIG. 9 is selected via a high level selection signal at WL selection, a bottom NMOS transistor is turned off, enabling selective charging of the WLa/WLb lines via the multiplexers, where the arrangement of buffers at the multiplexer input is configured to cycle through the possible multiplexer input values (i.e., 00, 01, 10, 11) based on receipt of the single selection signal at WL selection. The multiplexers are configured to select from one of four delay lengths to be applied before charging (e.g., 0, 2, 4, or 6 delay units). The WLa/WLb lines are charged when both the selected delay is applied via a top PMOS transistor (i.e., a low output from the multiplexer indicates that the delay is ended and the control line (e.g., WLa, WLb) should be turned on) and the PUF cell row is selected via the lower PMOS transistor (i.e., the low signal at WL selection turns on the lower PMOS transistor providing a path from the source to the control line (WLa/WLb) when the top PMOS transistor is on). Through selection signals to the two multiplexers, WLa/WLb signals can be transmitted with varying time differences between them (e.g., from 0 to 30 ps as depicted in FIG. 7).

Figure 10:
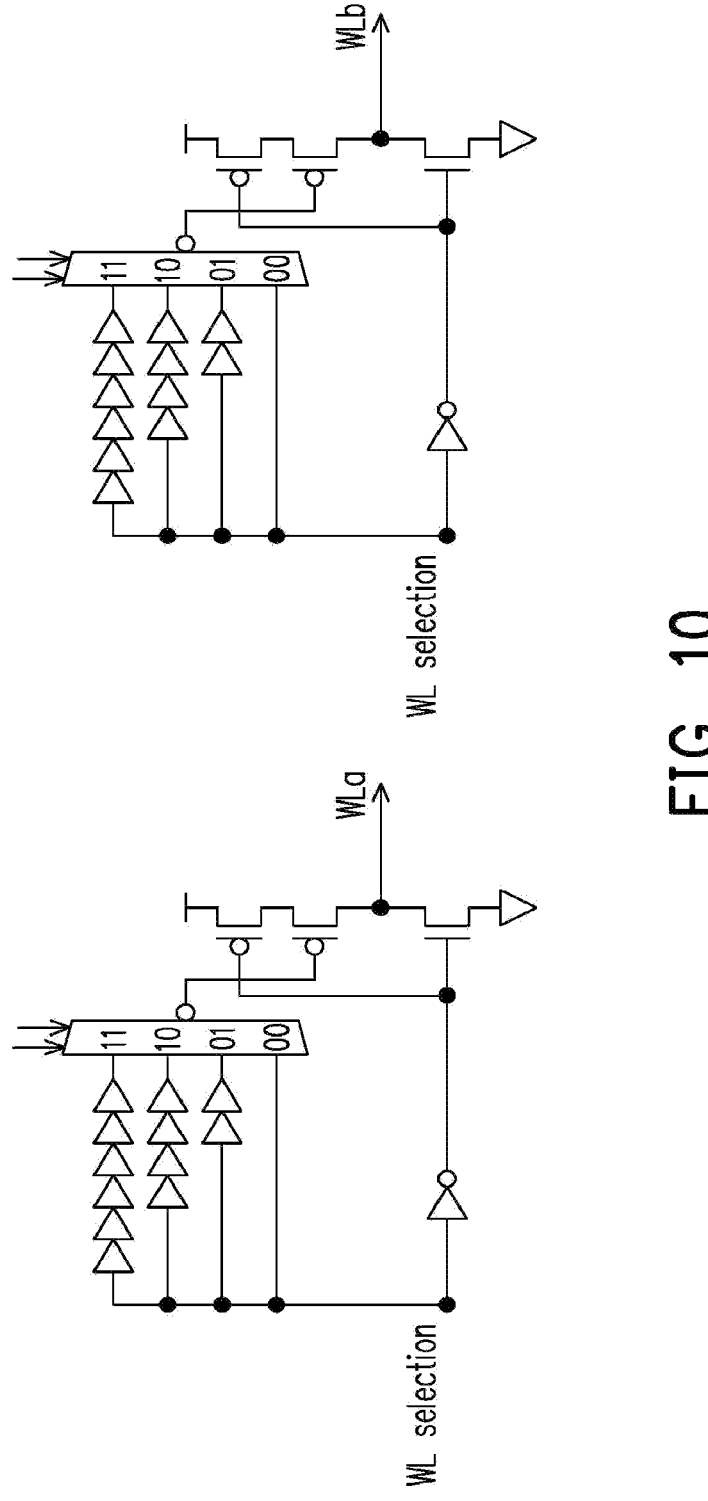
FIG. 10 depicts a second circuit for generating WLa/WLb control signals that includes pre-charging in accordance with embodiments.

FIG. 10 depicts a second circuit for generating WLa/WLb control signals that includes pre-charging in accordance with embodiments. The circuit of FIG. 10 functions similarly to that of FIG. 9 but varies in to which PMOS transistors the PUF cell row selection signal and delayed application signal from the multiplexer are tied. In the example of FIG. 10, the top PMOS transistors are activated when the PUF cell row is selected, enabling pre-charging of the node between the PMOS transistors. That pre-charge is then applied to the WLa/WLb control signal line upon passage of the selected delay as commanded by the output of the multiplexer. The circuit of FIG. 10 can provide faster rise time of the WLa/WLb signals upon passage of the selected delay period via the pre-charging between the PMOS transistors.

Figure 11:
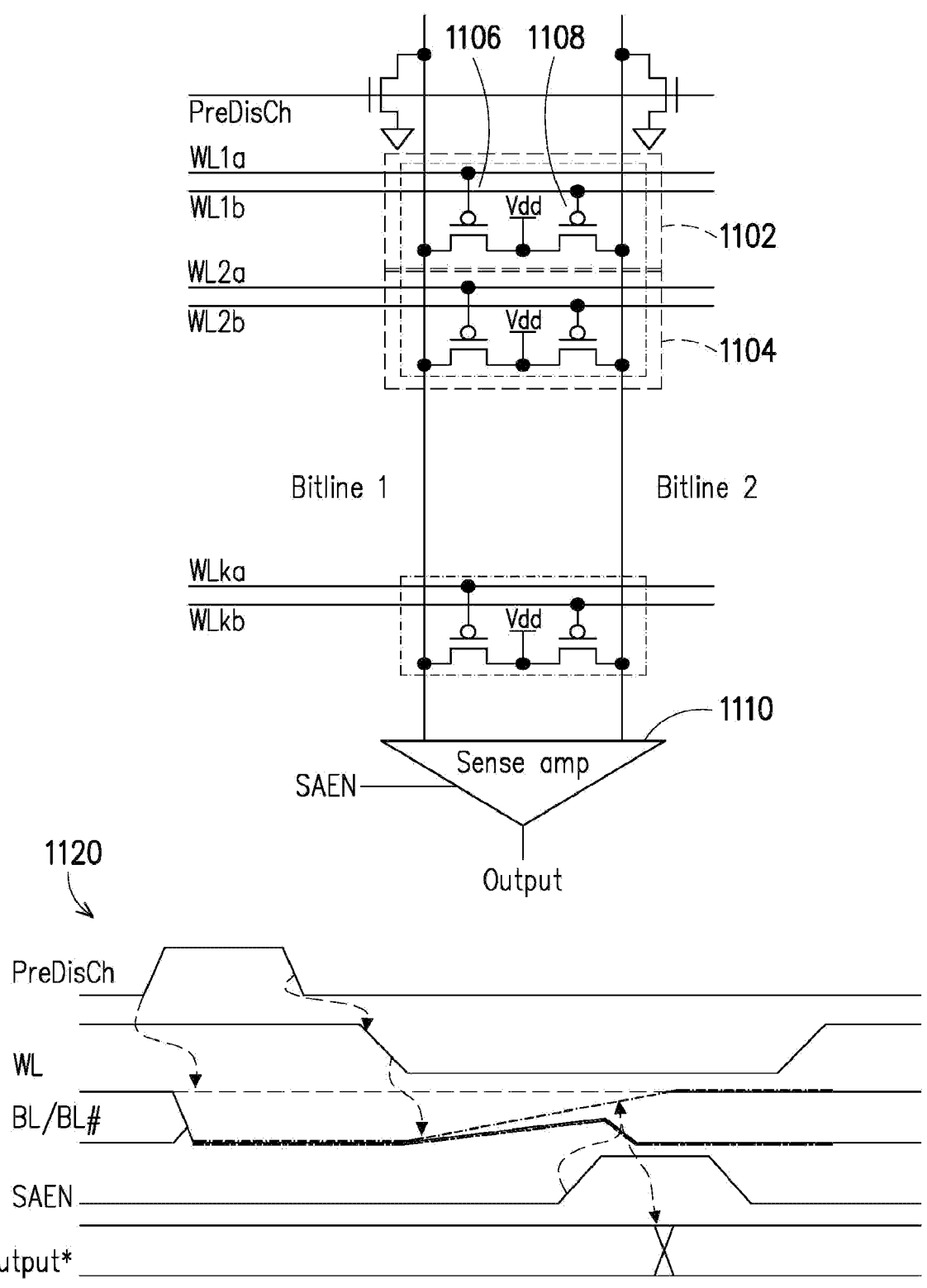
FIG. 11 is a diagram depicting an example structure of a column of PMOS-based PUF cells in an exemplary embodiment.

As noted above, PUF cells may take a variety of forms. FIG. 11 is a diagram depicting an example structure of a column of PMOS-based PUF cells in an exemplary embodiment. Each cell (e.g., 1102, 1104) includes two similarly structured transistors (e.g., PMOS transistors 1106, 1108 for PUF cell 1102). PUF cell 1102 receives two input signals WL1a, WL1b, where input signal WL1a controls the gate of transistor 1106 and input signal WL1b controls the gate of transistor 1108. One terminal of each transistor 1106, 1108 is connected to a bit line (i.e., transistor 1106 is connected to Bitline1 (BL #) and transistor 1108 is connected to Bitline2 (BL)), with the other terminal being connected to a common, source node.

A timing diagram depicting signals received and produced via PUF cell 1102 when its input signals are provided in synchronization is illustrated at 1120. As discussed above, control signals (WL1a, WL1b) are provided to the inputs of the PUF cell (e.g., the gates of transistors 1106, 1108) in synchronization (i.e., at the same or substantially the same time) to determine a base PUF cell value in a testing mode or to determine a PUF cell value in an operational mode. (Signals WL1a/WL1b provided in synchronization are depicted as a single signal WL in FIG. 11.) A pre-discharge signal (PreDisCh) goes high, which discharges the two bit lines BL/BL # to a low level. The control signals WL1a, WL1b are brought low at the same time, which activates the transistors 1106, 1108. The now-active transistors 1106, 1108 pull the bit lines high via the common source node between the transistors 1106, 1108. But process variations (e.g., slight differences in fabricated structure between transistors 1106, 1108) cause the transistors 1106, 1108 to pull the bit lines BL/BL # high at slightly different rates (i.e., transistor 1108 pulls bitline BL high faster than transistor 1106 pulls bitline BL # high). During the transition of the bit lines BL/BL #, the sense amplifier 1110 is activated via a sense amp enable signal SAEN. The sense amplifier 1110 is configured to detect a difference between signal levels on the bit lines BL/BL # on activation and to force the bit line that is at a higher level (i.e., BL in the example of FIG. 11) to a high level and the bit line that is at a lower level (i.e., BL # in the example of FIG. 11) to a low level. The sense amplifier 1110 outputs a corresponding data value (Output) for the PUF cell based on which of the bit lines BL/BL # was forced to the high level (e.g., a high (1) value if BL is forced high, a low (0) value if BL # is forced high). Following sensing of a PUF cell value for cell 1102, the control signal generator 106 can pre-discharge the bit lines again and activate PUF cell 1104 via control lines WL2a, WL2b in a similar fashion, with a PUF cell value for cell 1104 being determined in conjunction with the sense amplifier 1110, with subsequent rows of PUF cells being similarly activated and detected. While the example of FIG. 11 provides control signals WL1a, WL1b in synchronization, PUF cell stress conditions can be simulated as described in other examples herein, such as by supplying those control signals to the PUF cell out of synchronization.

Figure 12:
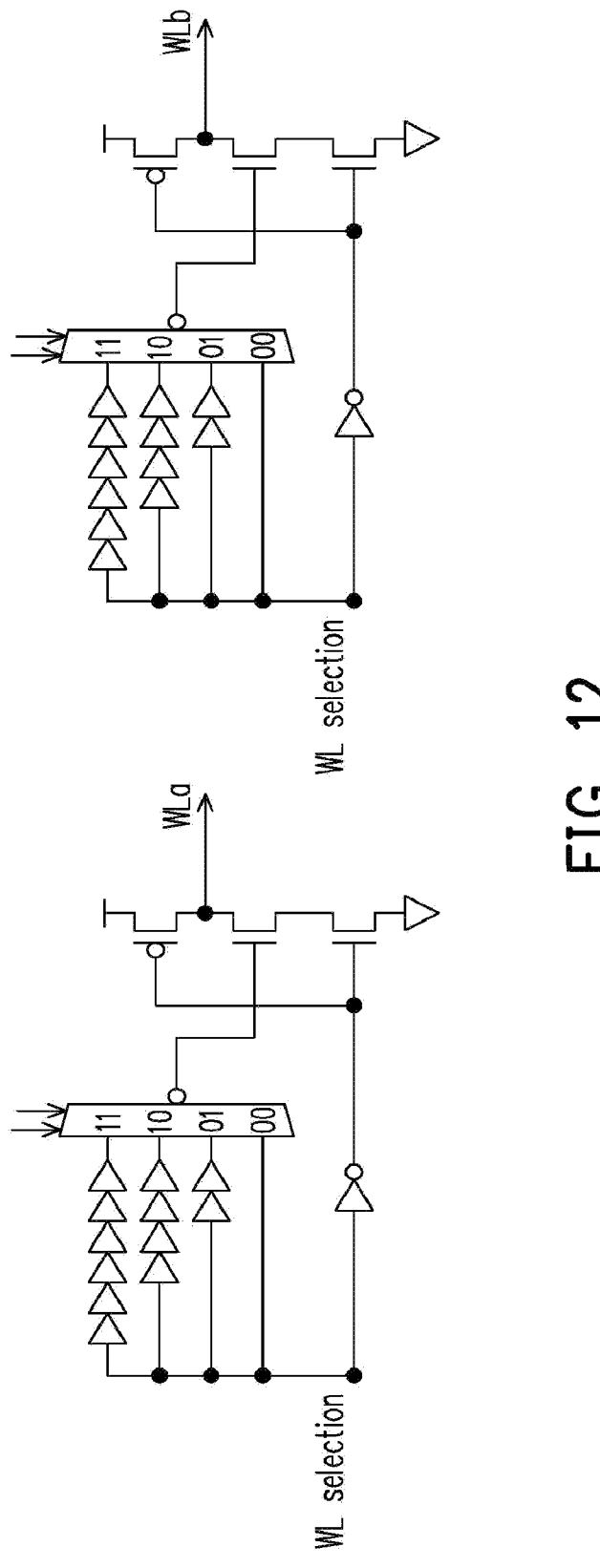
FIG. 12 depicts a circuit for generating WLa/WLb active-low controls signals from a WL selection signal in accordance with embodiments.

FIG. 12 depicts a circuit for generating WLa/WLb active-low controls signals from a WL selection signal in accordance with embodiments. When a row of PUF cells associated with the circuit of FIG. 12 is selected via a low level signal, a bottom NMOS transistor is turned on, enabling selective discharging of the WLa/WLb lines via the multiplexers. The multiplexers are configured to select from one of four delay lengths to be applied before charging (e.g., 0, 2, 4, or 6 delay units). The WLa/WLb lines are discharged charged when both the selected delay is applied via a top NMOS transistor and the PUF cell row is selected via the lower NMOS transistor. Those lines are charged via the top PMOS transistor when the PUF cell row is not selected. Through selection signals to the two multiplexers, WLa/WLb signals can be transmitted with varying time differences between them, including synchronous transmission during operation and operation-like modes.

Figure 13:
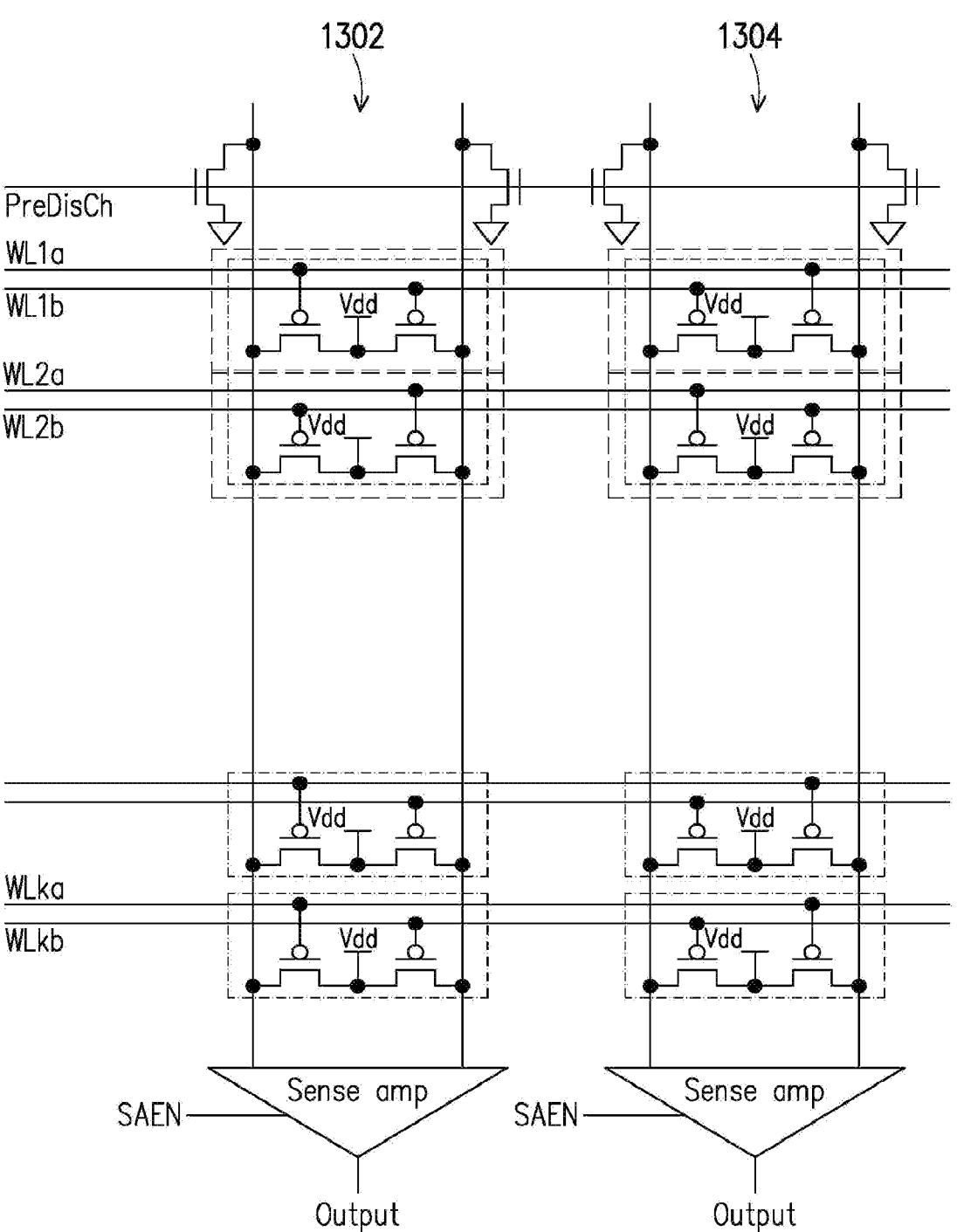
FIG. 13 is a diagram depicting a PUF array having different PUF cell structures across columns in accordance with embodiments.

The transistor level PUF cell examples highlight structures of a single column of a PUF array 104. In embodiments, each column of a PUF array 104 is substantially identically structured (i.e., each column of the PUF array 104 is structured the same as the example column of FIG. 4). In embodiments, different columns of a PUF array 104 may be structured differently. For example, FIG. 13 is a diagram depicting a PUF array 104 having different PUF cell structures across columns in accordance with embodiments. In the example of FIG. 13, a first column 1302 (or odd columns, or even columns) of the PUF array 104 is structured substantially identically to the PUF array column of FIG. 11, where a left hand PMOS transistor is controlled by a first control line (e.g., WL1*a*) and a right hand PMOS transistor is controlled by a second control line (e.g., WL2*a*). In a next column 1304, the left hand PMOS transistor is controlled by the second control line (e.g., WL2*a*) and the right hand PMOS transistor is controlled by the second control line (e.g., WL1*a*). The pattern of FIG. 13 may be repeated for other sets of two columns in the PUF array 104. Such structural varying arrangements across rows or columns of a PUF array can increase the likelihood of creation of unique identifiers for integrated circuits.

FIG. 14 is a flow diagram depicting steps of a method is provided for determining a reliability of a physically unclonable function (PUF) cell of a device in accordance with embodiments. The steps are described below with reference to structures discussed above for clarity, but the steps are applicable to many other structures as well. A first signal (WL1*a*) is provided to a first branch 406 of a PUF cell and a second signal (WL1*b*) is provided to a second branch 408 of the PUF cell at 1402, the first and second signals being provided in synchronization (see, e.g., FIG. 5). A base PUF cell value is determined based on an output of the PUF cell produced by the first signal and the second signal at 1404. At 1406, a third signal is provided to the first branch 406 and a fourth signal is provided to the second branch 408, the third signal and fourth signal being provided out of synchronization (see, e.g., FIG. 6). At 1408, a stressed PUF cell value is determined based on an output of the PUF cell produced by the third signal and the fourth signal. The PUF cell is determined to be unusable at 1410 based on a difference between the PUF cell value and the stressed PUF cell value (see, e.g., FIG. 7).

According to some embodiments, a method is provided for determining a reliability of a physically unclonable function (PUF) cell of a device. A first signal is provided to a first branch of a PUF cell and a second signal is provided to a second branch of the PUF cell, the first and second signals being provided in synchronization. A base PUF cell value is determined based on an output of the PUF cell produced by the first signal and the second signal. A third signal is provided to the first branch and a fourth signal is provided to the second branch, the third signal and fourth signal being provided out of synchronization. A stressed PUF cell value is determined based on an output of the PUF cell produced by the third signal and the fourth signal. The PUF cell is determined to be unusable based on a difference between the PUF cell value and the stressed PUF cell value.

In embodiments, a device configured to provide a physically unclonable function (PUF) value includes a plurality of PUF cells, each configured to provide a PUF contribution to the PUF value. Each of the PUF cells includes a first transistor having a gate controlled by a first control line, a first terminal connected to a first signal line, and a second terminal connected to a common node; and a second transistor having a gate controlled by a second control line, a first terminal connected to a second signal line, and a second terminal connected to the common node. A sense amplifier is configured to determine a signal level difference between the first and second signal lines to determine a PUF cell value, and a control signal generator is configured to provide signals to the first control line and the second control line in both a synchronized manner and an asynchronous manner to identify unusable cells based on PUF cell value changes.

In a further embodiment, a device comprising a cell configured to provide a physically unclonable function (PUF) value includes a first transistor having a gate controlled by a first control line, a first terminal connected to a first signal line, and a second terminal connected to a common node; and a second transistor having a gate controlled by a second control line, a first terminal connected to a second signal line, and a second terminal connected to the common node, wherein a sense amplifier is configured to determine a signal level difference between the first and second signal line to determine a PUF cell value.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of determining a reliability of a physically unclonable function (PUF) cell of a device that provides an output on a set of two bit lines, comprising:
   providing a first signal to a first branch which corresponds to a first word line of the PUF cell and a second signal to a second branch which corresponds to a second word line of the PUF cell, the first signal and the second signal being substantially identical signals and provided in synchronization to gate terminals of the first and second branches respectively;
   determining a base PUF cell value based on an output of the PUF cell produced by the first signal and the second signal, wherein the output is based on a voltage difference between the two bit lines; and
   determining that the PUF cell is unusable based on the base PUF cell value.

2. The method of claim 1, wherein the method further comprises:

providing a third signal to the first branch and a fourth signal to the second branch, the third signal and the fourth signal being spaced in time by a first predetermined amount; and determining a first stressed PUF cell value based on an output of the PUF cell produced by the third signal and the fourth signal.

3. The method of claim 2, further comprising determining that the PUF cell is unusable based on a difference between the base PUF cell value and the first stressed PUF cell value.

4. The method of claim 1, further comprising repeating said providing first and second signals and determining a base PUF cell value for a plurality of additional PUF cells to determine additional unusable PUF cells.

5. The method of claim 1, further comprising storing a mask in a computer-readable memory that identifies PUF cells of the device that are unusable based on reliability determinations.

6. The method of claim 5, further comprising:

determining a device signature based on usable PUF cells using the mask; and transmitting the device signature from the device using a secure channel.

7. The method of claim 6, further comprising:

providing a first operational signal to the first branch of the PUF cell and a second operational signal to the second branch of the PUF cell, the first and second operation signals being provided in synchronization; and determining an operational PUF cell value based on an output of the PUF cell produced by the first operational signal and the second operational signal, wherein the operational PUF cell value is used as a component of a signature of the device in operation.

8. The method of claim 1, wherein the PUF cell comprises two substantially similar transistors, one associated with the first branch and one associated with the second branch, each transistor controlling a voltage of the respective bit line, and one terminal of each of the transistors is connected to a ground node or a source node.

9. The method of claim 8, wherein determining the base PUF cell value comprises amplifying the voltage difference between the bit lines.

10. The method of claim 8, further comprising precharging or predischarging the bit lines prior to providing the first signal and the second signal.

11. The method of claim 1, further comprising determining a number of unusable PUF cells associated with the device, wherein the device is classified or rejected based on the number of unusable PUF cells.

12. A device configured to provide a physically unclonable function (PUF) value, comprising:

a first transistor having a gate controlled by a first control line which corresponds to a first word line of the PUF cell, a first terminal connected to a first bit line, and a second terminal connected to a common node;

a second transistor having a gate controlled by a second control line which corresponds to a second word line of the PUF cell, a first terminal connected to a second bit line, and a second terminal connected to the second terminal of the first transistor; and a sense amplifier configured to determine a voltage difference between the first and second bit lines to determine a PUF cell value, whereby a first signal of the first control line and a second signal of the second control line are substantially identical signals and provided in synchronization to the gates of the first and second transistors respectively.

13. The device of claim 12, wherein the first control line and the second control line are connected to a plurality of PUF cells for simultaneous control of the plurality of PUF cells.

14. The device of claim 12, further comprising a control signal generator configured to provide signals to the first control line and the second control line in series to identify unusable cells based on PUF cell value changes, wherein the control signal generator comprises a first multiplexer for selecting a delay for a signal on the first control line and a second multiplexer for selecting a delay for a signal on the second control line.

15. The device of claim 14, wherein the control signal generator is further configured to control the PUF cells to determine whether PUF cell values changed when signals are provided to the first control line and the second control lines with different amounts of asynchronous time spacing.

16. The device of claim 14, wherein the first transistor and the second transistor are NMOS transistors, wherein the common node is a ground node, wherein the device further comprises a precharging circuit, the precharging circuit configured to charge the first and second bit lines before the control signal generator provides signals to the first control line and the second control line to begin discharging the first and second bit lines via the NMOS transistors.

17. The device of claim 14, wherein the first transistor and the second transistor are PMOS transistors, wherein the common node is a source node, wherein the device further comprises a predischarging circuit, the predischarging circuit configured to discharge the first and second bit lines before the control signal generator provides signals to the first control line and the second control line to begin charging the first and second bit lines via the PMOS transistors.

18. A device comprising:

a control signal generator configured to provide a first signal to a first gate terminal of a first branch of a physically unclonable function (PUF) cell and a second signal to a second gate terminal of a second branch of the PUF cell, wherein the first and second signals are substantially identical signals and provided in synchronization, and the first branch corresponds to a first word line of the PUF cell and the second branch corresponds to a second word line of the PUF cell; and a PUF strength analyzer configured to determine a base PUF cell value based on an output of the PUF cell produced by the first signal and the second signal and to determine that the PUF cell is unusable based on the base PUF cell value, wherein the output is based on a voltage difference between two bit lines coupled to the PUF cell.

19. The device of claim 18, wherein the control signal generator is further configured to provide a third signal to the first branch and a fourth signal to the second branch out of synchronization and the PUF strength analyzer is further configured:

to determine a stressed PUF cell value based on an output of the PUF cell produced by the third signal and the fourth signal; and to determine that the PUF cell is unusable based on a difference between the base PUF cell value and the stressed PUF cell value.

20. The method of claim 1, wherein the first signal and the second signal transition from a logic low level to a logic high level substantially simultaneously.

\* \* \* \* \*